INVENTOR.
Peter Sisco.

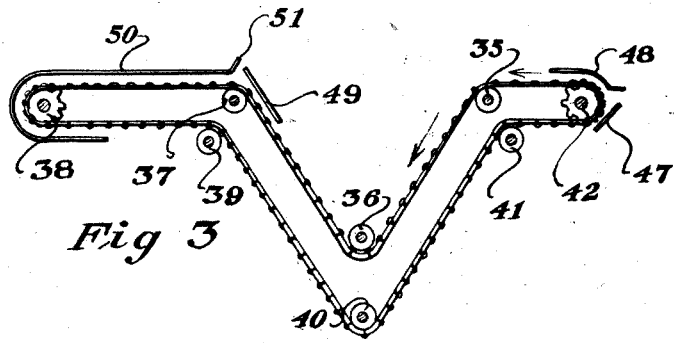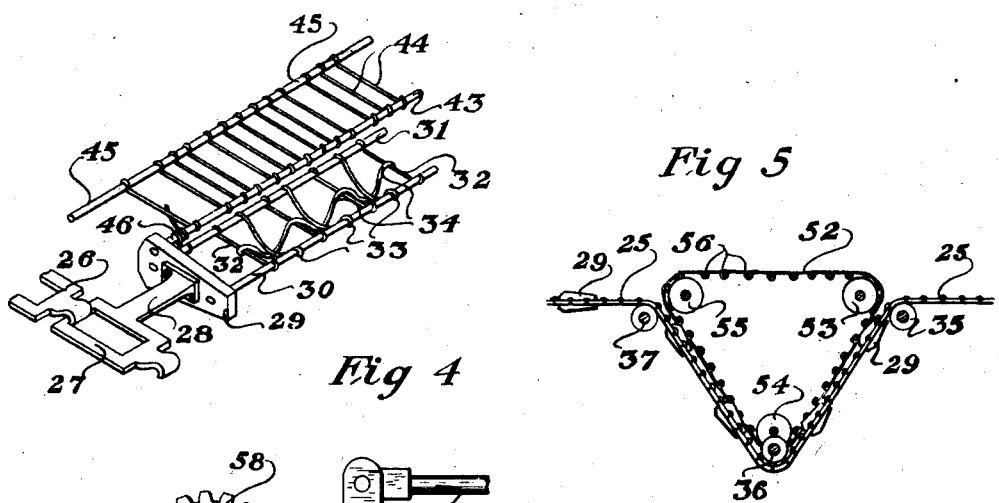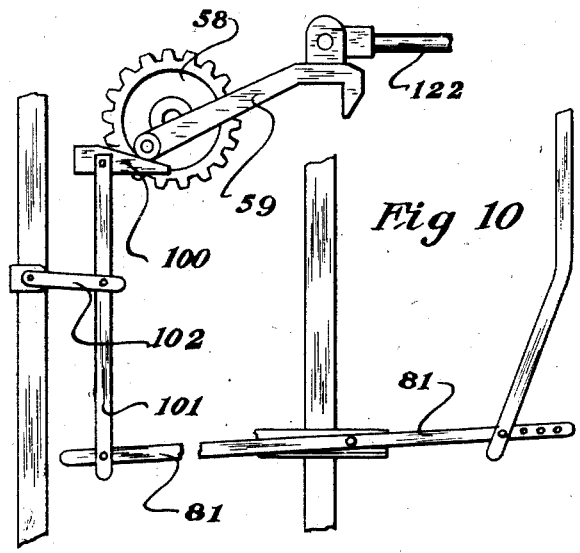

Jan. 15, 1929.
P. SISCO
CONFECTION DIPPING MACHINE
Filed April 22, 1924   3 Sheets-Sheet 3
1,699,315
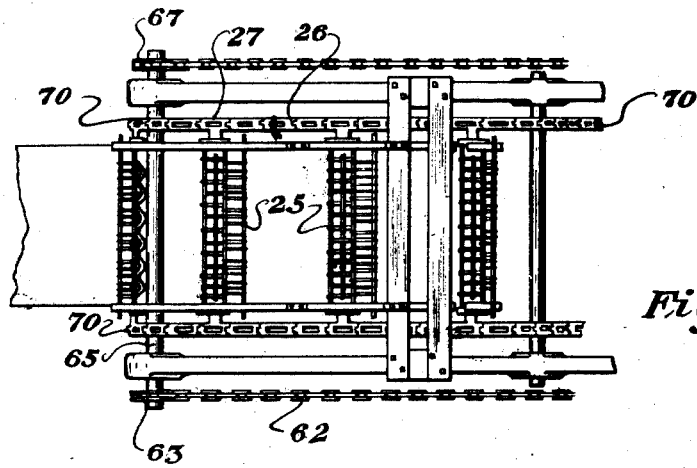
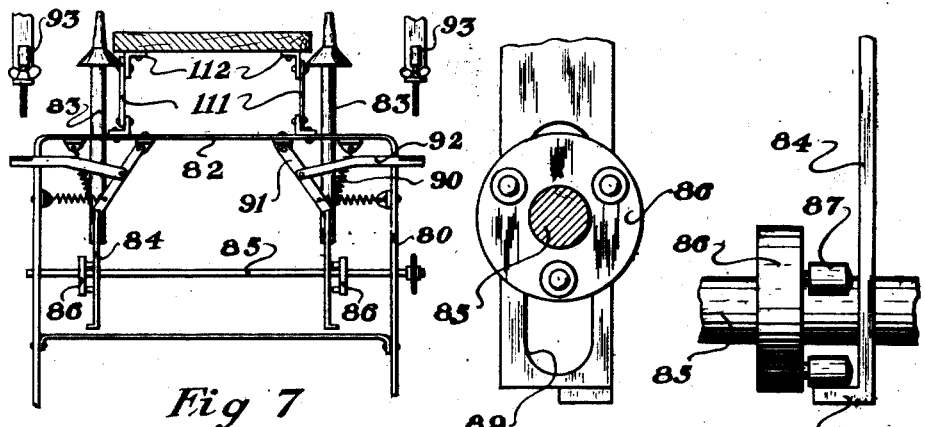
INVENTOR.
Peter Sisco.
BY
ATTORNEY.

Patented Jan. 15, 1929.

1,699,315

UNITED STATES PATENT OFFICE.

PETER SISCO, OF CHICAGO, ILLINOIS.

CONFECTION-DIPPING MACHINE.

Application filed April 22, 1924. Serial No. 708,133.

The present invention relates to a candy dipping machine, and has particularly to do with a device for applying fondant or other coatings of a high fusing point or having sugar as a principal ingredient.

Among the objects of the invention are:

The production of a device capable of covering centers with "hot" or "cold" coatings;

The application of means for distinctly marking the coated finished pieces for identification as the product of the machine;

The coordination of the several elements of a candy coating machine whereby each coated piece is sufficiently hardened in the machine before discharged therefrom;

The combination of several mechanisms, including the dipping and discharge elements, whereby a synchronously operated device is obtained;

The provision of novel and improved mechanisms for dipping centers, and discharge and conveying means associated therewith synchronously actuated;

The provision of mechanisms for providing intermittent related motions, and for synchronizing associated steps in candy manufacture;

The production of a discharge means adapted to eject the coated pieces without jarring or distortion; and The improvement, in general, of candy coating or dipping mechanisms.

These, and such other objects as may hereinafter appear are attained by the construction, combination, and arrangement of the various elements of the device, hereinafter described and fully illustrated in the accompanying drawings made a part of this specification, and in which:—

Figure 3 is a somewhat diagrammatic representation of the travel of the dipping baskets;

Figure 4 is a perspective of a portion of the dipping basket belt;

Figure 5 is a section showing a different form of basket cover than that illustrated in Figure 4;

Figure 6 is a fragmentary top view particularly illustrating the basket arrangement;

Figure 7 is a transverse elevation showing the table lifting mechanism and the discharge hammers;

Figures 8 and 9 are sections taken at right angles showing the hammer actuating mechanism; and Figure 10 is a detail of the table lifting mechanism.

In the description which follows and in the drawings, similar parts are indicated by identical reference characters.

Figure 1:
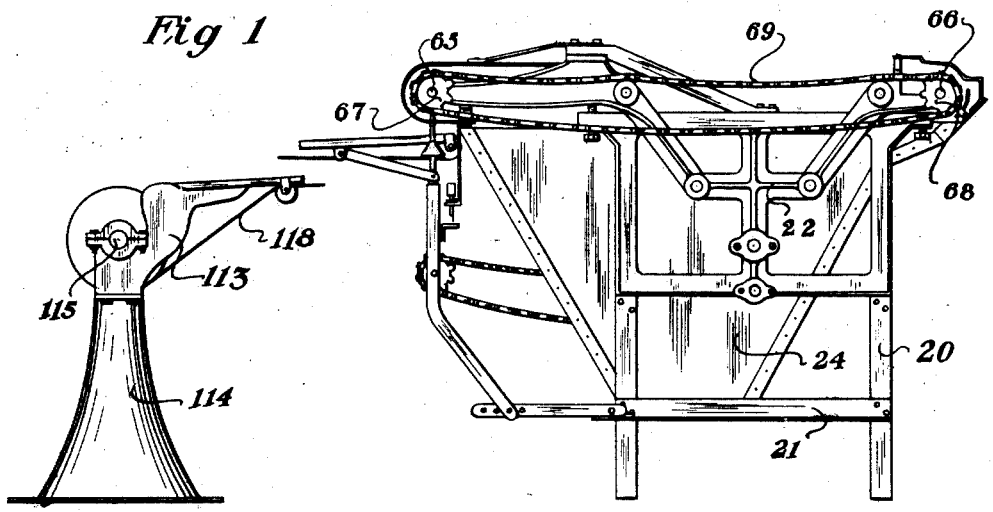
Figure 1 is a side elevation of a machine embodying the invention, part of the discharge table being broken away.

A suitable frame having an enlarged top section and comprising a plurality of upright and cross members, 20 and 21, is arranged to provide a platform for the dipping mechanism and to support the reservoir or tank for the coating material. At each side of the frame and intermediate upright and cross members 20 and 21 are side members 22 and 23 in which various transverse shafts are journalled.

A tank or reservoir 24 of V-shape extends across the frame and is secured to uprights 20, and lends rigidity to the frame work.

Upon the top of the frame is disposed an endless belt 25 comprising mainly the confection baskets, such baskets being devised to convey the uncoated confection centers from one end of the machine, hereinafter called the loading end, through the coating material in tank 24, to the other end of the machine hereafter designated the delivery end, where the coated confections are discharged onto a conveyor table.

Looking next at Figures 4 and 6, it will be seen that the baskets are arranged transversely of said endless belt 25, which belt comprises links 26 and 27. Links 26 are for spacing while links 27 each are provided with inwardly directed lugs 28 upon which are secured wedge shape blocks 29 forming the end pieces of each row of baskets.

Rods 30 and 31 extending the width of belt 25 are rigidly secured at their opposite ends to blocks 29, and a series of straight and curved wires, 32 and 33, are secured to said rods, 30 and 31, preferably by having their ends passed through apertures drilled in said rods to receive said wires and clinched thereabout. Between each pair of adjacent straight wires 32 is a transversely disposed curved wire 34, such wire having a configuration or curve substantially identical with wire 33, to which it is preferably welded or otherwise attached. Wires 33 and 34, form a curved dish or basket to receive the candy centers to be coated, the baskets extending the entire width of belt 25 and being arranged in separated rows spaced by a number of links 26 interposed between links 27. Baskets may be made detachable from end plates or blocks 29, in which event end peices are used between rods 30 and 31, and are detachably connected to said blocks 29.

Endless belt 25 travels in a horizontal direction from the loading position at the loading end of the machine, the right hand end of Figure 1, over roller 35 or other rotating bearings until over the edge of reservoir 24, thence downwardly thereinto, under a roller bearing 36 disposed in said tank, up the opposite side over a roller bearing 37 and again in a horizontal course parallel to its first described course to the discharge end of the machine where upon being inverted over a roller 38 the coated confection is discharged, thence backward over rollers 39, 40, 41 and 42 to the original loading position in a course substantially parallel to but beneath the course of the loaded basket just described, said bearings 39, 40, and 41 keeping the lower section or unloaded portion of belt 25 separated from the upper layer or loaded section. Bearings 35, 36, 37, 39, 40 and 41 may be transverse shafts journalled in end pieces 22 and 23.

It can be readily perceived that the confection centers may be accidentally displaced from the baskets unless a means for covering said baskets during immersion of the centers in the confection coating in tank 24 is provided. Two types of covers are here disclosed.

In Figure 4, a hinged cover is illustrated. A third rod 43, is arranged intermediate blocks 29 and is rotatably mounted therein above rod 31. Projecting from said rod 43 in parallel relation are a plurality of substantially straight wires 44, each wire being passed through a hole drilled in said rod 43, after which the wires 44 are clinched about said rod. The other end of wires 44 is passed through a rod 45 the ends of which project beyond block 29 and are fastened to said rod 45 in the same manner as to rod 43. A swinging cover is thus provided for each transverse row of baskets, and a spring 46 coiled about rod 43 and having its ends anchored upon rod 31 and the end wire 44 maintains said cover normally in a closed position. At the loading end of the machine, a track comprising two sections 47 and 48 (see Figure 3) engages the outwardly projecting ends of rod 45, the first section 47, to swing said cover away from the baskets, and the second section 48 to maintain said cover in the position shown in Figure 4 while the operator is dropping candy centers into each of the baskets. It is manifest that as the belt 25 turns about bearing 42 it is moving away from the end of rod 45 which is impinging track 47. When the rod 45 disengages itself from track 47, the whole cover is trailing the baskets which has passed beyond bearing 42. Track 48 serves only to keep said cover from being sprung forward until the loading of the row of baskets has been accomplished. The rod 45 disengages itself from track 48 during forward movement of belt 25 and before said belt 25 begins its downward and immersing course in tank 24. As soon as clear of track 48, the spring 46 forces the cover into its normally closed relation to said basket, such closed position being maintained during the entire immersing of the centers and until just prior to the time the discharge of the confections from the machine is desired.

As each basket leaves the reservoir 24, a track 49 engages the projecting end of rod 45. Such track lifts the cover but slightly during the remainder of the upward movement of the basket but when said basket begins again its horizontal travel, the rod 45 is caused to trail the basket and the cover is opened wide by the horizontal movement of the basket away from the cover. When the limit of opening is reached by the cover, the force of spring 46 causes the rod 45 to disengage itself from track 49. Immediately upon disengagement from track 49,—said rod 45 engages a second track 50 at its upturned end 51. Further advance of belt 25 causes the rod 45 to travel downwardly on the under side of track end 51 and then horizontally under track 50 until the belt 25 reverses its travel around bearing 38. Track 50 is curved to correspond with the changed travel of belt 25 and the cover rod 45 is held back by said curved track until the coated confections are discharged, which unloading occurs immediately the belt 25 starts its return journey. After the unloading of the baskets, the cover returns to normal position to so remain until track 47 is again encountered.

The second form of closure for the baskets is disclosed in Figure 5. Such closure comprises an endless belt 52 moving about three bearings 53, 54, and 55, said belt comprising a plurality of spaced rods 56 intermediate which any desired meshing may be employed. Said belt 52 may be driven by the same prime mover actuating belt 25, such movement to be coincident with and at the speed of belt 25, or, as illustrated, belt 52 may be actuated by engagement of the transverse rods 30 and 31 of belt 25 with the transverse rods 56 of the covering belt 52. Actual covering contact with the baskets in belt 25 is had during the down and up movements of said belt 25, but no contact is had during any of the horizontal movements of said belt.

It must be apparent from the nature of the machine and the work it performs that an intermittent movement of belt 25 is necessary, first to admit of an opportunity to load the baskets, and second to obtain a satisfactory discharge of the contents of the baskets, as will be shown later.

Power is applied to the machine through a transverse shaft 57 journalled in side plates 22 and 23. Any desired prime mover may be employed and suitable power connecting and disengaging means should be provided between the prime mover and shaft 57. Rotation of shaft 57 produces a constant rotation of gear wheel 58 to which said shaft 57 is geared.

A pawl 59 is pivoted to one face of said wheel 58 and engages a ratchet 60 having plurality of rather large teeth, said teeth alternately being engaged by the pawl 59. Driven by gearing rotated by ratchet 60 is a sprocket wheel 61 which drives a chain 62, which chain engages sprockets 63 and 64 at the ends of shafts 65 and 66 transversely arranged with respect to the frame of the machine. At the opposite end of each of said shafts 65 and 66 a second sprocket, 67 and 68, is arranged, and a chain 69 is arranged intermediate said last mentioned sprockets.

With the rotation of shaft 57, gear 58 is rotated. Pawl 59 engages ratchet 60, and with each revolution of gear 58, the ratchet 60 is advanced one-sixth of a turn, said ratchet as shown having six teeth. The gearing carried by said ratchet is of course advanced one-sixth revolution and drives sprocket 61 a portion of a revolution predetermined by the ratio existing between the meshing gears. Sprocket 61 drives chain 62 which in turn actuates shafts 65 and 66. The chain 69 is in turn actuated by said shafts 65 and 66, which carry sprockets 70 meshing with belt 25, and in this manner give to said belt a periodically intermittent motion. The baskets upon belt 25 are so spaced that at each period of rest between the intermittent actuations through sprockets 70, one row of baskets is open at the loading point in the upper horizontal plane adjacent shaft 66 (which may provide the bearing 42) while another row is open at the other end of the machine, said last mentioned row of baskets having passed about said shaft 65 which may provide the bearing 38 on the last previous advance of belt 25. The remaining series of baskets are arranged at spaced intervals so that each actuation of the machine positions one row thereof for loading and another row thereof ready for discharge. Feeding of the machine may be by hand or by machine, as preferred.

As the uncoated confections pass into reservoir 24, they acquire a layer of the plastic or liquid material therein contained. The excess of such material runs off during the travel of the basket upward and away from the reservoir 24. Reservoir 24 extends beneath that portion of belt 25 in horizontal position at the discharge end of the machine to receive drippings occurring during such travel. Drippings thus are returned to the reservoir 24 to be used again. Any suitable heating appliance (none shown) may be associated with the reservoir 24 to keep the coating material at a constant temperature as is necessary for uniform thicknesses of coatings.

The horizontal travel of belt 25 previous to reaching the discharge end of the machine is to admit of partial cooling or "setting" the confection coating. It is manifest that such horizontal travel may be of any desired extent to obtain a specific degree of "setting" for the coating material. As the horizontal travel before discharge occurs, a surface hardening is taking place. During such partial setting, the confection rests upon the crossed wires 33 and 34. The confection is discharged as an incident to the baskets being inverted, hence the portion of the confection resting upon the crossed wires 33 and 34 forms the top thereof. The partial setting occurring while the confection coating is cooling produces a cross mark on the finished confection, such mark being the more or less pronounced according to the length of travel of the confection from emersion from the coating material to discharge from the baskets. Such a mark readily identifies the finished confection from a hand dipped piece.

Although the coating material is partially set by surface hardening when the confections are discharged from each row of baskets, the coating material is still so plastic that a drop or fall, or vibration, will cause "feet" to form about the bottom thereof. "Feet" upon a confection may be defined as an excessive spreading of the coating material about the base of the confection to form an unsightly mass and creates too great a thickness of coating on a line with the bottom thereof.

In order to disengage the confections from the basket, in the event they are inclined to adhere thereto as an incident to partial setting, a hammer mechanism or shaker is devised.

Figure 2:
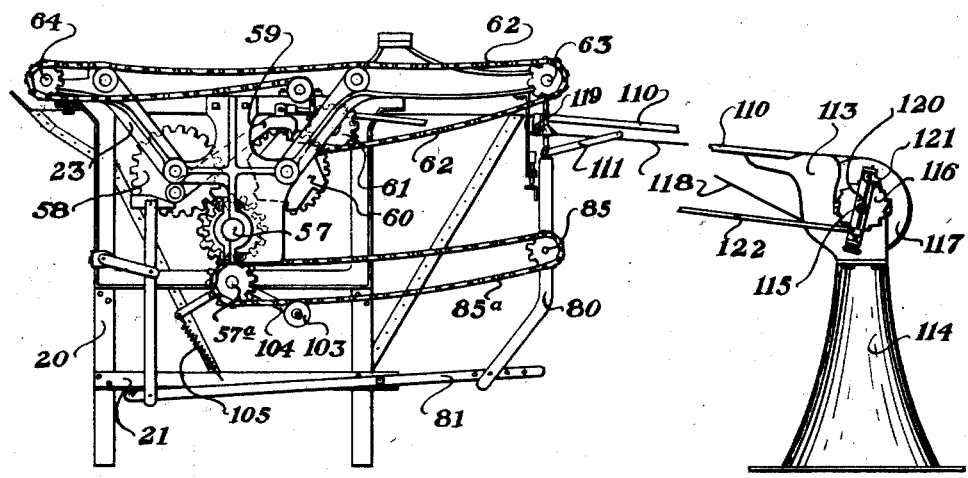
Figure 2 is an elevation of the opposite side, part of the gears being omitted and the discharge table being broken away at its center.

For the hammer parts, see Figures 7, 8 and 9, disclosing a rectangular frame 80 disposed at the discharge end of the coating machine (Figures 1 and 2). At its lower end, said frame is pivoted to an oscillating arm 81 carried by uprights 20. Passing through the upper cross bar of frame 82 in housings 83 provided therefor are two reciprocating hammers 84, each of which is adapted to impinge block 29 when the frame 80 is lifted to its uppermost position. Journalled in the side pieces of said frame 80 is a shaft 85 carrying two disks 86 having three equidistantly disposed rollers 87 (see Figure 7 and 8) adapted to engage a lug 88 on hammers 84 at their lower ends. Such lug 88 extends from the center of the lower end of hammer 84 to one edge thereof and is adapted to be impinged by rollers 87 upon disk 86 while each row of baskets rests for discharge thereabove, and only after said frame 80 has been raised to its highest position. The lower end of hammers 84 is also slotted at 89 to allow the shaft 85 to freely rotate therein. In order to actuate the hammers 84 and to give them a constant and predetermined force, a coil spring 90 is secured thereto and to the cross bar 82. A trigger or catch mechanism adapted to maintain the lugs 88 free from impinging contact with rollers 87, and comprising a pivoted arm or trigger 91 engaging the hammer 84 and a lever 92 secured to said pivoted arm 91 is mounted upon frame 80 to hold the hammers 84 free from engagement with rollers 86 except during the uppermost position of frame 80. When in such uppermost position, the hammers 84 intermittently impinge blocks 29, the lift of the hammers being that of the pull of rollers 87 from impinging lug 88 to disengagement when a dead center is reached. Levers 92 may be arranged to be moved in slots in frame 80 provided therefor or may otherwise be suitably disposed upon said frame. As the frame 80 rises the outer end of said levers 92 is impinged by adjustable screws 93 affixed to the machine frame to force trigger 91 out of engagement with hammer 84, thus releasing said hammer to tap block 29. As frame 80 recedes, the lever 92 disengages itself from screw 93 and upon the hammer 84 being forced down by one of rollers 87, trigger 91 returns to its locking position, being so urged by a spring 94 anchored thereto and to frame 80.

To obtain an intermittent raising and lowering of frame 80, a wedge shaped cam 100 (Figure 10) engages pawl 59 at the point of its pivot, and is forced downwardly with each rotation of gear 58. A lever 101 is secured intermediate the frame supporting arm 81 and cam 100 said lever 101 being secured to the machine frame by a link 102. With each intermittent movement of belt 25, the frame 80 is lifted until the hammers 84 approach blocks 29 when said hammers 84 are impinged by the rollers 87 on disks 86, said disks being rotated by shaft 85 constantly driven by a chain 85ª intermediate the sprocket on said shaft 85 and a sprocket 57ª upon a gear wheel rotated by engagement with gearing on shaft 57. A take-up pulley 103 carried by a lever 104 pivoted about the shaft carrying sprocket 57ª and actuated by spring 105 anchored upon a cross member 21 removes such slack from said chain 85ª as may be incident to the reciprocating movement of frame 80. The frame 80 approaches belt 25 concurrently with each intermittent advance of the latter, the tapping effect of hammers 84 not developing however until the belt 25 has come to rest. After a number of tappings, the hammers 84 are latched by the arm or trigger 91 against further movement until the next row of baskets is ready for discharge and frame 80 begins to fall. After a short downward travel of frame 80 has taken place, belt 25 is again actuated.

To receive the discharged confections, either released from the baskets by the force of gravity or dislodged therefrom by such force aided by the tapping of hammers 84 upon the blocks 29, a discharge and conveyer member comprises a table 110 secured at one end by a pair of links and brackets, 111 and 112, respectively, to frame 80, (Figure 7) and attached at its opposite end to pivoted hangers 113 carried upon a standard 114. Said standard also supports a transverse shaft 115 to which a toothed wheel 116 is keyed. Said shaft 115 also carries a wide pulley 117 about which an endless belt 118 travels, said belt 118 also travelling about a wide roller 119 at the opposite end of table 110. The direction of travel of said belt is such that the upper stratum moves from the discharge end of the coating machine toward the standard 114, the lower layer being the return portion of the belt 118. As the table 110 is secured to frame 80, the endless belt 118 is brought immediately under each discharging row of baskets upon each upward movement of said frame 80, so close to said brackets that the coated confections drop but a fraction of an inch if at all, in order to reach belt 118 travelling on table 110. To advance belt 118 after receiving each consecutive discharge from the baskets, a lever 120 is pivoted about shaft 115 and has at its upper end a pawl 121 engaging toothed wheel 116. Said pawl 121 may be moved toward or away from wheel 116 to regulate the rotation of pulley 117 and the advance of endless belt 118. The lower end of lever 120 is pivotally connected to a rod 122 actuated by shaft 57, whereby movement of pulley 117 is made concurrently with movement of belt 25, neither belt advancing until the frame 80 has dropped sufficiently, however, to allow the discharged confections to clear the baskets when moved away from the machine on belt 118. The link 111 permits of regulating the up and down movement of table 110, the upward movement of which is less than that of frame 80.

Although the operation of the machine should be manifest from the description preceding, for elucidation, the steps through which a batch of centers pass through the machine will be briefly detailed.

A row of baskets upon an endless belt 25 is brought into horizontal loading position at one end of the machine, and a center is dropped into each basket. The belt 25 advances until a second row of baskets is in loading position, and is loaded. The belt 25 again advances and a third series of baskets is loaded. The baskets, after loading, are closed either by a spring cover as described, or by a second endless belt 52, and as the loading of additional rows of baskets continues, the first loaded row passes into and out of the reservoir 24 containing the liquid coating material. The cover for the baskets is removed or lifted and the coated confections travel toward the other end of the machine for discharge. At the discharge end of the machine, the baskets are inverted and the coated candy is discharged onto an endless belt 118 supported by a table 110, said table being raised to substantially abut the baskets as they are inverted. Hammers 84 approach and strike the basket frames or blocks 29 while the belts 25 and 118 are stationary, dislodging any confection which is adhering to the baskets. The table 110 and hammers 84 recede, to rise again upon the discharge of the next series of baskets, the belt 25 beginning its advance as soon as table 110 has receded sufficiently to allow the completed candy pieces to be clear of the baskets.

Endless belt 118 carries away rows of completed candies being intermittently advanced after the table 110 begins to recede. The candies are removed from belt 118 in any desired way as the candies approach the standard 114, and may then be stored until packed and sold.

I claim:

1. A candy coating machine comprising a frame, a plurality of baskets, a reservoir, a cover for said baskets, and discharge means comprising a conveyor, a frame supporting said conveyor, a hammer, actuating means for said hammer, and a latch member for said hammer, and means for releasing said latch member incident to the movement of said conveyor frame.

2. A candy dipping machine comprising a frame, a plurality of baskets, a reservoir, a cover for said baskets, a hammer, actuating means to selectively effect engagement between said hammer and baskets, and a shaft having a disc provided with a plurality of spaced rollers upon one face thereof, said rollers impinging said hammer incident to the rotation of said shaft.

PETER SISCO.